(12) United States Patent
Takahashi et al.

(10) Patent No.: US 8,149,364 B2
(45) Date of Patent: Apr. 3, 2012

(54) ANTIGLARE FILM, MANUFACTURING METHOD THEREOF AND TRANSMISSION TYPE LIQUID CRYSTAL DISPLAY

(75) Inventors: Kae Takahashi, Toyko (JP); Yusuke Tochigi, Tokyo (JP); Takahiro Morinaga, Tokyo (JP)

(73) Assignee: Toppan Printing Co., Ltd (JP)

( * ) Notice: Subject to any disclaimer, the term of this patent is extended or adjusted under 35 U.S.C. 154(b) by 291 days.

(21) Appl. No.: 12/567,522

(22) Filed: Sep. 25, 2009

(65) Prior Publication Data
US 2010/0079708 A1 Apr. 1, 2010

(30) Foreign Application Priority Data
Sep. 26, 2008 (JP) ................................. 2008-247527

(51) Int. Cl.
*G02F 1/1335* (2006.01)

(52) U.S. Cl. ........................................................ 349/137
(58) Field of Classification Search ........................ None
See application file for complete search history.

(56) References Cited

U.S. PATENT DOCUMENTS
6,791,649 B1 * 9/2004 Nakamura et al. ............ 349/137

FOREIGN PATENT DOCUMENTS

| JP | 06-018706 | 1/1994 |
|---|---|---|
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-260748 | 9/2003 |
| JP | 2004-004777 | 1/2004 |

* cited by examiner

*Primary Examiner* — Lucy Chien
(74) *Attorney, Agent, or Firm* — Squire Sanders (US) LLP (57) ABSTRACT

This invention provides an antiglare film of a type with a low content of particles that makes it possible to increase contrast, the antiglare film demonstrating appropriate antiglare property, small white blurring, and a low level of glittering, and also a method for manufacturing the film and a transmission type liquid crystal display. In the antiglare film, a content ratio of the particles in the binder matrix is within a range of 0.5-5 wt. %, a refractive index difference $|n_A - n_M|$ is equal to or greater than 0.010, $R_{25}/R$ is in the range of 0.7-0.9, $R_{75}/R$ is in the range of 1.10-1.30, and $R_{75}/H$ is in the range of 0.70-1.50.

6 Claims, 3 Drawing Sheets

ANTIGLARE FILM, MANUFACTURING METHOD THEREOF AND TRANSMISSION TYPE LIQUID CRYSTAL DISPLAY

CROSS REFERENCE TO RELATED APPLICATION

This application is based on and claims the benefit of priority from the Japanese Patent Application No. 2008-247527, filed on Sep. 26, 2008, the entire contents of which are incorporated herein by reference.

BACKGROUND OF THE INVENTION

1. Field of the Invention

The present invention relates to an antiglare film, a manufacturing method thereof, and a transmission type liquid crystal display. In particular, the invention relates to an antiglare film that can be provided on the surface of a window or a display such as a liquid crystal display (LCD), a CRT display, an organic electroluminescence display (ELD), a plasma display (PDP), a surface emission display (SED), and a field emission display (FED) as well as a manufacturing method thereof and an LCD using the same.

2. Description of the Related Art

In the field of displays such as liquid crystal displays, CRT displays, EL displays, and plasma displays, an antiglare film having a concave-convex structure on the surface is known to be provided on the display surface in order to prevent the decrease in visibility caused by reflection of external light on the display surface during viewing.

For example, a method for forming a concave-convex structure on the surface of an antiglare film by emboss processing and a method of forming a concave-convex structure on the surface of an antiglare film by coating a coating liquid in which particles are admixed to a material forming a binder matrix and dispersing the particles in the binder matrix are known as methods for forming an antiglare film having a concave-convex structure on the surface. In the antiglare film in which a concave-convex structure formed by such methods is provided on the surface, the external light falling on the antiglare film is scattered by the concave-convex structure of the surface, the image of external light becomes blurred, and the decrease in visibility caused by reflection of external light on the display surface can be prevented.

Accordingly, in the antiglare film in which concavities and convexities are formed on the surface by emboss processing, surface concavities and convexities can be fully controlled. Therefore, reproducibility is good. However, the problem is that where a defect or adhered foreign matter is present on the emboss roll, the defect will appear periodically with a pitch of the roll.

JP-A-6-18706 discloses antiglare films of various forms in which particles are dispersed in a binder matrix. The antiglare films using the binder matrix and particles described in JP-A-6-18706 can be manufactured by a process including fewer steps than that using the above-described embossing and, therefore, the antiglare films can be produced at a lower cost.

A variety of techniques used to obtain antiglare films using a binder matrix and particles have been disclosed. For example, JP-A-2003-260748 discloses a technique using a combination of a binder matrix resin, spherical particles, and irregular shape particles. JP-A-2004-004777 discloses a technique using a binder matrix resin and particles of a plurality of different diameters. JP-A-2003-004903 discloses a technique providing surface concavities and convexities and specifying the cross-sectional area of concavities.

JP-A-11-305010 discloses a technique using internal scattering together with surface scattering, setting the internal haze value (cloudiness) of the antiglare layer to 1%-15% and setting the surface haze value (cloudiness) to 7%-30%. JP-A-11-326608 discloses a technique using a binder resin and particles with a diameter of 0.5 μm to 5 μm, and setting the difference in refractive index between the binder resin and the particles into the 0.02 to 0.2 range. JP-A-2000-338310 discloses a technique using a binder resin and particles with a diameter of 1 μm to 5 μm, setting the difference in refractive index between the binder resin and the particles to 0.05-0.15, using an appropriate solvent, and setting the surface roughness within a predetermined range. JP-A-2000-180611 discloses using a binder resin and a plurality of types of particles and setting the difference in refractive index between the binder resin and the particles to 0.03-0.2. JP-A-11-160505 discloses a technique setting the surface haze (cloudiness) to a value equal to or greater than 3 and setting the difference between a haze value in the normal direction and a haze value in the direction at ±60° to a value equal to or less than 4.

Antiglare films of various configurations developed to attain a variety of objects have thus been disclosed. Performance of antiglare films used on the front surface of display differs between the displays. In other words, an optimum antiglare film differs depending on the resolution and object of use of the display. Therefore, antiglare films of various types corresponding to a variety of objects are needed.

Presently, antiglare films with a high contrast are required. Among them, antiglare films with a reduced content of particles in the antiglare layer that includes the particles in a binder matrix are required. However, although the contrast can be increased in the antiglare film with a small content ratio of the particles, it is often difficult to satisfy the requirements relating to antiglare ability, absence of white blurring, and also a low level of glittering.

SUMMARY OF THE INVENTION

It is an object of the present invention to provide an antiglare film of a type with a low content of particles that makes it possible to increase contrast, the antiglare film demonstrating appropriate antiglare property, small white blurring, and a low level of glittering, and also a method for manufacturing the film and a transmission type liquid crystal display.

A first aspect of the present invention is an antiglare film which has a transparent substrate and an antiglare layer that is formed on the transparent substrate, has a concave-convex structure on the surface on the opposite side from the transparent substrate, and includes a binder matrix and particles, wherein a content ratio of the particles in the binder matrix is within a range of equal to or greater than 0.5 wt. % and equal to or lower than 5 wt. %, a refractive index difference $|n_A-n_M|$ between a refractive index $n_A$ of the particles and a refractive index $n_M$ of the binder matrix is equal to or greater than 0.010, $R_{25}/R$, which is a value obtained by dividing a 25% diameter ($R_{25}$) of the particles by an average particle diameter R, is equal to or greater than 0.7 and equal to or less than 0.9, $R_{75}/R$, which is a value obtained by dividing a 75% diameter ($R_{75}$) of the particles by an average particle diameter R, is equal to or greater than 1.10 and equal to or less than 1.30, and $R_{75}/H$, which is a value obtained by dividing the 75% diameter ($R_{75}$) of the particles by an average film thickness H of the antiglare layer, is equal to or greater than 0.70 and equal to or less than 1.50.

A second aspect of the present invention is the antiglare film according to the first aspect of the present invention, wherein the average film thickness of the antiglare film is within a range of equal to or greater than 3.0 μm and equal to or less than 12.0 μm.

A third aspect of the present invention is a method for manufacturing an antiglare film which includes preparing a transparent substrate, forming a coating film by coating on the transparent substrate a coating liquid for forming an antiglare layer including a material for forming a binder matrix curable by ionizing radiation and particles, and curing the binder matrix with ionizing radiation, wherein a content ratio of the particles in the binder matrix is within a range of equal to or greater than 0.5 wt. % and equal to or lower than 5 wt. %, a refractive index difference $|n_A-n_M|$ between a refractive index $n_A$ of the particles and a refractive index $n_M$ of the binder matrix is equal to or greater than 0.010, $R_{25}/R$, which is a value obtained by dividing a 25% diameter ($R_{25}$) of the particles by an average particle diameter R, is equal to or greater than 0.7 and equal to or less than 0.9, $R_{75}/R$, which is a value obtained by dividing a 75% diameter ($R_{75}$) of the particles by an average particle diameter R, is equal to or greater than 1.10 and equal to or less than 1.30, and $R_{75}/H$, which is a value obtained by dividing the 75% diameter ($R_{75}$) of the particles by an average film thickness H of the antiglare layer, is equal to or greater than 0.70 and equal to or less than 1.50.

A fourth aspect of the present invention is the method for manufacturing an antiglare film according to the third aspect of the present invention, wherein the antiglare layer is formed by using a die coater method.

A fifth aspect of the present invention is a transmission type liquid crystal display formed by using the antiglare film according to the first or second aspect of the present invention, wherein the antiglare film, a polarizing plate, a liquid crystal cell, a polarizing plate, and a backlight unit are provided in the order of description from the observer side, and the antiglare layer of the antiglare film is on the surface facing the observer.

A sixth aspect of the present invention is a polarizing plate having the antiglare film according to the first or second aspect of the present invention, and a polarizing layer formed on a surface of the transparent substrate of the antiglare film that is opposite a formation surface of the antiglare layer.

A seventh aspect of the present invention is a transmission type liquid crystal display formed by using the polarizing plate according to the sixth aspect of the present invention, wherein the polarizing plate, a liquid crystal cell, a polarizing plate, and a backlight unit are provided in the order of description from the observer side, and the antiglare layer of the antiglare film is on the surface facing the observer.

In accordance with the present invention, it is possible to provide an antiglare film of a type with a low content of particles that makes it possible to increase contrast, the antiglare film demonstrating appropriate antiglare property, small white blurring, and a low level of glittering, and also a method for manufacturing the film and a transmission type liquid crystal display.

[Description of Reference Numerals and Signs]

| | |
|---|---|
| 100: | Antiglare film. |
| 110: | First transparent substrate. |
| 120: | Antiglare layer. |
| 121: | Binder matrix. |
| 122: | Particle(s). |
| H: | Average thickness of the antiglare layer. |
| 200, 300: | Transmission type LCD. |
| 210: | First polarizing plate. |
| 211: | Second transparent substrate. |
| 212: | Third transparent substrate. |
| 213: | First polarizing layer. |
| 220: | Liquid crystal cell. |
| 230: | Second polarizing plate. |
| 231: | Fourth transparent substrate. |
| 232: | Fifth transparent substrate. |
| 233: | Second polarizing layer. |
| 240: | Backlight unit. |
| 410: | Third polarizing plate. |
| 400: | Die coater. |
| 310: | Die head. |
| 320: | Pipework. |
| 330: | Coating liquid tank. |
| 340: | Transfer pump. |
| 350: | Rotary roll. |

DETAILED DESCRIPTION OF THE INVENTION

Embodiments of the invention will be described below with reference to the drawings. In the embodiments like constituent elements will be assigned with like reference symbols, and redundant explanation in the embodiments will be omitted.

Figure 1:
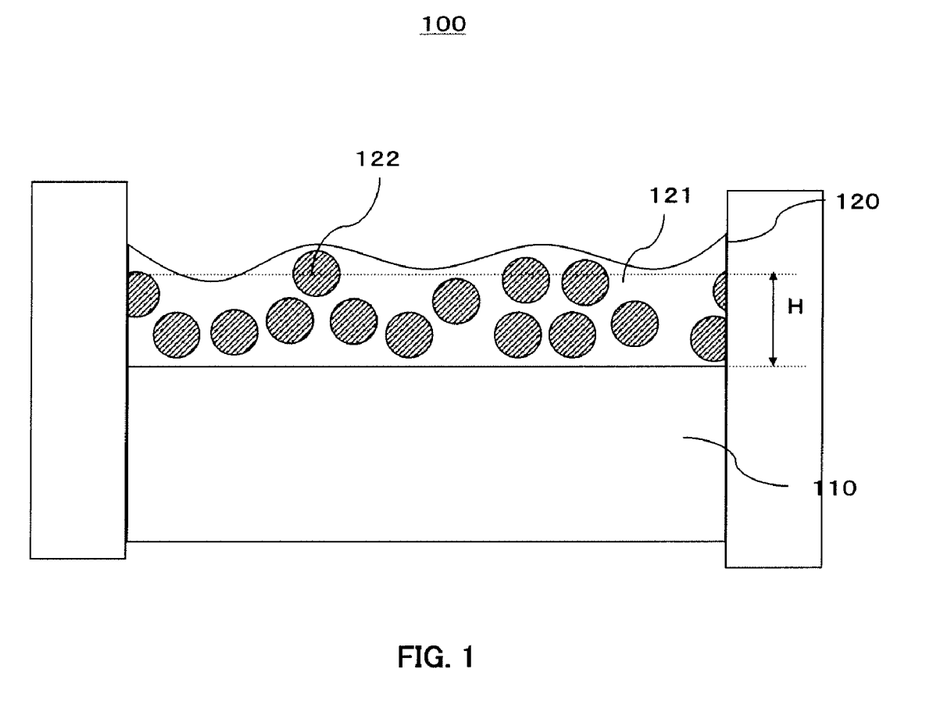
FIG. 1 is a schematic cross-sectional view illustrating the antiglare film of an embodiment of the present invention.

FIG. 1 is a schematic cross-sectional view illustrating an antiglare film 100 of an embodiment of the present invention. The antiglare film 100 of the embodiment of the present invention is provided with an antiglare layer 120 on a first transparent substrate 110. The antiglare layer 120 of the antiglare film 100 of the embodiment of the present invention includes a binder matrix 121 and particles 122.

In the antiglare film 100 of the embodiment of the present invention, the content ratio of the particles 122 in the binder matrix 121 is within a range of equal to or greater than 0.5 wt. % and equal to or lower than 5 wt. %, the refractive index difference $|n_A-n_M|$ between the refractive index $n_A$ of the particles 122 and the refractive index $n_M$ of the binder matrix 121 is equal to or greater than 0.010, $R_{25}/R$, which is a value obtained by dividing a 25% diameter ($R_{25}$) of the particles 122 by the average particle diameter R, is equal to or greater than 0.70 and equal to or less than 0.90, $R_{75}/R$, which is a value obtained by dividing a 75% diameter ($R_{75}$) of the particles 122 by an average particle diameter R, is equal to or greater than 1.10 and equal to or less than 1.30, and $R_{75}/H$, which is a value obtained by dividing the 75% diameter ($R_{75}$) of the particles 122 by an average film thickness H of the antiglare layer 120 is equal to or greater than 0.70 and equal to or less than 1.50.

A specific feature of the antiglare film 100 of the embodiment of the present invention is that the content ratio of the particles 122 in the binder matrix 121 is within a range of equal to or greater than 0.5 wt. % and equal to or lower than 5 wt. %. By setting the content ratio of the particles 122 in the binder matrix 121 of the antiglare layer 120 within a range of equal to or greater than 0.5 wt. % and equal to or lower than 5 wt. %, it is possible to obtain the antiglare film 100 with a high contrast and antiglare ability. On the other hand, where the content ratio of the particles 122 in the binder matrix 121 of the antiglare layer 120 is higher than 5 wt. %, the antiglare film 100 with a high contrast cannot be obtained. Further, in a case where only the increase in contrast is taken into account, it is preferred that the content ratio of the particles 122 in the antiglare layer 120 of the antiglare film 100 be as low as possible. However, in a case where the content ratio of the particles 122 in the binder matrix 121 of the antiglare layer 120 is less than 0.5 wt. %, the antiglare film 100 with antiglare ability cannot be obtained.

In the antiglare film 100 of the embodiment of the present invention, the binder matrix 121 as referred to herein is the component of the antiglare layer 120 remaining after removing the particles 122. The antiglare film 100 of the embodiment of the present invention is formed by coating a coating liquid for forming the antiglare layer 120 on the first transparent substrate 110, and the material for forming the binder matrix 121 of the embodiment of the present invention is a material remaining after removing the particles 122 from the solid components of the coating liquid for forming the antiglare layer 120. Therefore, the material for forming the binder matrix 121 can also include, if necessary, an additive such as a photopolymerization initiator and a surface adjusting agent and also a thermoplastic resin in addition to an acrylic material serving as the main component.

A specific feature of the antiglare film 100 of the embodiment of the present invention is that the refractive index difference $|n_A - n_M|$ between the refractive index $n_A$ of the particles 122 and the refractive index $n_M$ of the binder matrix 121 is equal to or greater than 0.01. In the antiglare film 100 of the embodiment of the present invention, where the refractive index difference $|n_A - n_M|$ between the refractive index $n_A$ of the particles 122 and the refractive index $n_M$ of the binder matrix 121 is equal to or greater than 0.01, the antiglare film 100 with no glittering can be obtained. Where the refractive index difference $|n_A - n_M|$ between the refractive index $n_A$ of the particles 122 and the refractive index $n_M$ of the binder matrix 121 is less than 0.01, the incident light cannot be sufficiently scattered by the formed antiglare layer 120 and, therefore, appropriate antiglare ability cannot be obtained. Furthermore, glittering occurs at the antiglare film 100 that easily occurs when the antiglare film 100 is provided at a high-resolution display. However, in a case where the refractive index difference $|n_A - n_M|$ between the refractive index $n_A$ of the particles 122 and the refractive index $n_M$ of the binder matrix 121 is greater than 0.07, the antiglare layer 120 can be whitened, and it is especially preferred that the refractive index difference $|n_A - n_M|$ between the refractive indexes be within a range of equal to or greater than 0.01 and equal to or less than 0.07.

In the embodiment of the present invention, the refractive index $n_M$ of the binder matrix 121 means a refractive index of a film after the film is formed from the binder matrix 121. Where a material for forming the binder matrix 121 is of a radiation curable type that can be cured by ionizing radiation, the refractive index $n_M$ of the binder matrix 121 is a refractive index after irradiation and curing with the ionizing radiation. Thus, a refractive index in a location of the antiglare layer 120 from which the particles 122 have been removed is the refractive index of the binder matrix 121. The refractive index $n_M$ of the binder matrix 121 and the refractive index $n_A$ of the particles 122 can be found by a Becke line detection method (liquid immersion method).

A specific feature of the antiglare film 100 of the embodiment of the present invention is that $R_{25}/R$, which is a value obtained by dividing a 25% diameter ($R_{25}$) of the particles 122 by the average particle diameter R, is equal to or greater than 0.70 and equal to or less than 0.90, $R_{75}/R$, which is a value obtained by dividing a 75% diameter ($R_{75}$) of the particles 122 by an average particle diameter R, is equal to or greater than 1.10 and equal to or less than 1.30.

In the antiglare film 100 of the embodiment of the present invention, the external light falling on the surface of the antiglare layer 120 is scattered by providing a concave-convex structure on the surface of the antiglare layer 120, and the image of the external light that is reflected by the surface of the antiglare film 100 is blurred. In a case where the antiglare layer 120 is composed of the binder matrix 121 and particles 122, concavities and convexities on the surface of the antiglare layer 120 are formed by the particles 122 that protrude individually or in the form of aggregates of a plurality thereof from the surface. However, where the scale of the concave-convex structure on the surface of the antiglare film 100 is made too small, the external light cannot be sufficiently scattered by the surface of the antiglare film 100. Thus, appropriate antiglare ability cannot be obtained. Where the concavities and convexities on the surface are too large, the external light will be overly scattered by the surface of the antiglare film 100, and when the surface of the antiglare film 100 is irradiated with fluorescent light or the like as the external light, a white blurring phenomenon occurs. In the antiglare film 100 of a type with a low content of particles in which the content ratio of the particles 122 is within a range of equal to or greater than 0.5 wt. % and equal to or less than 5 wt. %, and the appropriate antiglare property and absence of white blurring are in a tradeoff relationship and are difficult to attain at the same time.

The inventors have discovered that appropriate antiglare ability can be provided and white blurring can be inhibited where $R_{25}/R$, which is a value obtained by dividing a 25% diameter ($R_{25}$) of the particles 122 by the average particle diameter R, is equal to or greater than 0.70 and equal to or less than 0.90, $R_{75}/R$, which is a value obtained by dividing a 75% diameter ($R_{75}$) of the particles 122 by an average particle diameter R, is equal to or greater than 1.10 and equal to or less than 1.30.

Where $R_{25}/R$, which is a value obtained by dividing a 25% diameter ($R_{25}$) of the particles 122 by the average particle diameter R, is less than 0.70, the antiglare film 100 with sufficient antiglare property cannot be obtained. Furthermore, the antiglare film 100 with a certain glittering is sometimes obtained. Where $R_{25}/R$, which is a value obtained by dividing a 25% diameter ($R_{25}$) of the particles 122 by the average particle diameter R, exceeds 0.90, the antiglare film 100 demonstrates white blurring. Where $R_{75}/R$, which is a value obtained by dividing a 75% diameter ($R_{75}$) of the particles 122 by the average particle diameter R, is less than 1.10, the antiglare film 100 with sufficient antiglare property cannot be obtained. Furthermore, where $R_{75}/R$, which is a value obtained by dividing a 75% diameter ($R_{75}$) of the particles 122 by the average particle diameter R, is greater than 0.90, the antiglare film 100 demonstrates white blurring. Furthermore, the antiglare film 100 with a certain glittering is sometimes obtained.

A specific feature of the antiglare film 100 of the embodiment of the present invention is that $R_{75}/H$, which is a value obtained by dividing the 75% diameter ($R_{75}$) of the particles 122 by an average film thickness H, is equal to or greater than 0.70 and equal to or less than 1.50. In a case where $R_{75}/H$, which is a value obtained by dividing the 75% diameter ($R_{75}$) of the particles 122 by an average film thickness H, is less than 0.70, concavities and convexities are difficult to form on the surface of the antiglare layer 120, antiglare ability decreases, and reflection of the external light cannot be sufficiently prevented. Where $R_{75}/H$, which is a value obtained by dividing the 75% diameter ($R_{75}$) of the particles 122 by an average film thickness H, is greater than 1.50, large convexities are formed on the surface of the antiglare layer 120, surface convexities and concavities become too large, white blurring occurs when the external light is reflected, and the antiglare film 100 that has glittering is obtained. Further, in a case where $R_{75}/H$, which is a value obtained by dividing the 75% diameter ($R_{75}$) of the particles 122 by an average film thickness H of the antiglare layer 120, is greater than 1.50, concavities are easily scraped off when the surface of the antiglare layer 120 is rubbed, and abrasive resistance of the antiglare film 100 decreases.

The 25% diameter ($R_{25}$), 75% diameter ($R_{75}$), and average particle diameter R of the particles used in the embodiment of the present invention are found with a particle diameter distribution measurement device of a light scattering type. At an integrated particle diameter distribution curve in which the particle diameter that can be obtained with the particle diameter distribution measurement device of a light scattering type is plotted against the abscissa, and the particle weight (integrated %) is plotted against the ordinate, the particle diameter at a particle weight of 25% (integrated %) becomes the 25% diameter ($R_{25}$) of the particles 122 and the particle diameter at a particle weight of 75% (integrated %) becomes the 75% diameter ($R_{25}$). Further, in the embodiment of the present invention, the average film thickness H of the antiglare layer 120 is an average value of film thickness after the size of convexities produced by the particles 122 is removed from the thickness of the antiglare layer 120. The average film thickness H can be found with a scanning electron microscope.

In the antiglare film 100 of the embodiment of the present invention, the average film thickness H of the antiglare layer 120 is preferably within a range of equal to or greater than 3.0 μm and equal to or less than 12.0 μm. In a case where the average film thickness H of the antiglare layer 120 is less than 3.0 μm, the antiglare film 100 obtained cannot demonstrate sufficient hardness necessary for the film to be provided on the display surface. Where the average film thickness H of the antiglare layer 120 is greater than 12.0 μm, the cost rises, the degree of curling of the obtained antiglare film 100 increases, and the film is unsuitable for processing necessary for the film to be provided on the display surface. A more preferred thickness H of the antiglare layer 120 is within a range of equal to or greater than 4.0 μm and equal to or less than 10.0 μm.

In the embodiment of the present invention, the material forming the binder matrix 121 preferably includes an acrylic material. The acrylic material used in the material for forming the binder matrix 121 is, for example, a multifunctional acrylate such as an acrylic acid or methacrylic acid ester of a polyhydric alcohol, a multifunctional urethane acrylate such as synthesized from a hydroxyl ester of diisocyanate, a polyhydric alcohol, and acrylic acid or methacrylic acid, a polyether resin, a polyester resin, an epoxy resin, an alkyd resin, a spyroacetal resin, a polybutadiene resin, or a polythiol-polyene resin having an acrylate or methacrylate functional group. These acrylic materials are curable by ionizing radiation, and a hard film having hard coat ability can be obtained by irradiation with ultraviolet radiation or electron beam to form a three-dimensional network structure. Thus, the antiglare film 100 with sufficient hard coating ability for providing on the display surface can be obtained.

In the antiglare film 100 of the embodiment of the present invention, the binder matrix 121 as referred to herein is the component of the antiglare layer 120 remaining after removing the particles 122. The material for forming the binder matrix 121 of the embodiment of the present invention is a material remaining after removing the particles 122 from the solid components of the coating liquid for forming the antiglare layer 120. Therefore, the material for forming the binder matrix 121 can also include, if necessary, an additive such as a photopolymerization initiator and a surface adjusting agent and also a thermoplastic resin in addition to the acrylic material.

If necessary, functional layers having antireflection ability, antistatic ability, antifouling ability, electromagnetic shielding ability, infrared radiation absorbing ability, ultraviolet radiation absorbing ability, and color correction ability can be provided, if necessary, on the antiglare film 100 of the embodiment of the present invention. Examples of such functional layers include an antireflection layer, an antistatic layer, an antifouling layer, an electromagnetic shielding layer, an infrared radiation absorbing layer, an ultraviolet radiation absorbing layer, and a color correcting layer. These functional layers may be a single layer or a plurality of layers. The functional layer may have a plurality of functions in one layer, for example, an antireflection layer may have an antifouling ability. Further, these functional layers may be provided between the first transparent substrate 110 and antiglare layer 120 or may be provided on the antiglare layer 120. In the embodiment of the present invention, a primer layer or an adhesive layer may be provided to improve bonding ability between the layers.

A method for manufacturing the antiglare film 100 of the embodiment of the present invention will be described below. The method for manufacturing the antiglare film 100 of the embodiment of the present invention includes a step of coating a coating liquid for forming the antiglare layer 120 that includes a material for forming the binder matrix 121 that can be cured by ionizing radiation and the particles 122 on the first transparent substrate 110 and forming a coating film on the first transparent substrate 110 and a curing step of curing the material for forming the binder matrix 121 by ionizing radiation, thereby making it possible to form the antiglare layer 120 on the first transparent substrate 110.

Glass or a plastic film can be used as the first transparent substrate 110 of the embodiment of the present invention. Any plastic film having appropriate transparency and mechanical strength may be used. Examples of suitable films include polyethylene terephthalate (PET), triacetyl cellulose (TAC), diacetyl cellulose, acetyl cellulose butyrate, polyethylene naphthalate (PEN), cycloolefin polymers, polyimides, polyethersulfones (PES), polymethyl methacrylate (PMMA), and polycarbonates (PC). Among them, a triacetyl cellulose film can be advantageously used because it has small birefringence and good transparency. In a case where the antiglare film 100 of the embodiment of the present invention is provided on the surface of a liquid crystal display, it is especially preferred that a triacetyl cellulose film be used as the first transparent substrate 110.

The coating liquid for forming the antiglare layer 120 that is used for forming the antiglare layer 120 preferably includes a material for forming the binder matrix 121 curable by ionizing radiation and the particles 122.

For example, an acrylic material, which is a material curable by ionizing radiation, can be used as the material for forming the binder matrix. A multifunctional (meth)acrylate compound such as an acrylic acid or methacrylic acid ester of a polyhydric alcohol or a multifunctional urethane (meth)acrylate such as synthesized from a hydroxyl ester of diisocyanate, a polyhydric alcohol, and acrylic acid or methacrylic acid can be used as the acrylic material. In addition, a polyether resin, a polyester resin, an epoxy resin, an alkyd resin, a spyroacetal resin, a polybutadiene resin, or a polythiolpolyene resin having an acrylate or methacrylate functional group can be used as the material curable by ionizing radiation.

In the embodiment of the invention "(meth)acrylate" means both "acrylate" and "methacrylate". For example, "urethane (meth)acrylate" means both "urethane acrylate" and "urethane methacrylate".

Examples of monofunctional (meth)acrylate compounds include 2-hydroxyethyl(meth)acrylate, 2-hydroxypropyl (meth)acrylate, 2-hydroxybutyl (meth)acrylate, n-butyl (meth)acrylate, isobutyl(meth)acrylate, t-butyl (meth)acrylate, glycidyl(meth)acrylate, acryloyl morpholine, N-vinyl pyrrolidone, tetrahydrofurfuryl acrylate, cyclohexyl(meth) acrylate, 2-ethylhexyl(meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethylcarbitol (meth)acrylate, phosphoric acid (meth)acrylate, ethylene oxide-modified phosphoric acid (meth)acrylate, phenoxy (meth)acrylate, ethylene oxide-modified phenoxy (meth)acrylate, propylene oxide-modified phenoxy (meth)acrylate, nonylphenol (meth) acrylate, ethylene oxide-modified nonylphenol (meth)acrylate, propylene oxide-modified nonylphenol (meth)acrylate, methoxydiethylene glycol (meth)acrylate, methoxypolyethylene glycol (meth)acrylate, methoxypropylene glycol (meth)acrylate, 2-(meth)acryloyloxy-ethyl-2-hydroxypropyl phthalate, 2-hydroxy-3-phenoxypropyl (meth)acrylate, 2-(meth)acryloyloxyethyl hydrogen phthalate, 2-(meth)acryloyloxypropyl hydrogen phthalate, 2-(meth)acryloyloxypropyl hexahydrohydrogen phthalate, 2-(meth)acryloyloxypropyl tetrahydrohydrogen phthalate, dimethylaminoethyl (meth)acrylate, trifluoroethyl (meth)acrylate, trifluoropropyl (meth)acrylate, hexafluoropropyl (meth)acrylate, octafluoropropyl (meth)acrylate, octafluoropropyl (meth)acrylate, and adamantan derivative (meth)acrylates such as adamantly acrylate that has a monovalent mono(meth)acrylate derived from 2-adamantan and adamantan diol.

Examples of difunctional (meth)acrylate compounds include di(meth)acrylates such as ethylene glycol di(meth) acrylate, diethylene glycol di(meth)acrylate, butanediol di(meth)acrylate, hexanediol di(meth)acrylate, nonandiol di(meth)acrylate, ethoxylated hexanediol di(meth)acrylate, propoxydized hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxypyvalic acid neopentyl glycol di(meth)acrylate.

Examples of (meth)acrylate compounds with a functionality equal to or greater than three include trifunctional (meth) acrylate compounds such as tri(meth)acrylates, e.g., trimethylolpropane tri(meth)acrylate, ethoxylated trimethylolpropane tri(meth)acrylate, propoxydized trimethylolpropane tri(meth)acrylate, tris 2-hydroxyethyl isocyanurate tri(meth)acrylate, and glycerin tri(meth)acrylate, and also pentaerythritol tri(meth)acrylate, dipentaerythritol tri (meth)acrylate, and ditrimethylolpropane tri(meth)acrylate, multifunctional (meth)acrylate compounds with a functionality equal to or greater than three include pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, and ditrimethylolpropane hexa(meth)acrylate, and multifunctional (meth) acrylate compounds in which some of (meth)acrylates are substituted with an alkyl group or ε-caprolactone.

For example, compounds obtained by reacting a polyhydric alcohol, a polyisocyanate, and an acrylate containing a hydroxyl group can be used as the urethane (meth)acrylate compound. Examples of specific compounds include UA-306H, UA-306T, and UA-306I manufactured by Kyoeisha Chemical Co., Ltd., UV-1700B, UV-6300B, UV-7600B, UV-7605B, UV-7640B, and UV-7650B manufactured the Nippon Synthetic Chemical Industry Co., Ltd., U-4HA, U-6HA, UA-100H, U-6LPA, U-15HA, UA-32P, and U-324A manufactured by Shin-Nakamura Chemical Co., Ltd., Ebecryl-1290, Ebecryl-1290K, and Ebecryl-5129 manufactured by Daicel-Cytec Company Ltd., and UN-3220HA, UN-3220HB, UN-3220HC, and UN-3220HS manufactured by Negami Chemical Industrial Co., Ltd.

A thermoplastic resin can be used in addition to the acrylic material that is a material curable by ionizing radiation as the material forming the binder matrix 121. Examples of suitable thermoplastic resins include cellulose derivatives such as acetyl cellulose, nitrocellulose, acetylbutyl cellulose, ethyl cellulose, and methyl cellulose, vinyl resins such as vinyl acetate and copolymers thereof, vinyl chloride and copolymers thereof, and vinylidene chloride and copolymers thereof, acetal resins such as polyvinyl formal and polyvinyl butyral, acrylic resins such as acrylic resin and copolymers thereof and methacrylic resin and copolymers thereof, polystyrene resins, polyamide resins, linear polyester resins, and polycarbonate resins. Adhesion of the first transparent substrate 110 and antiglare layer 120 can be improved by adding a thermoplastic resin. Further, by adding a thermoplastic resin, it is possible to suppress curling of the manufactured antiglare film.

In a case where ultraviolet radiation is used as ionizing radiation, a photopolymerization initiator is added to the coating liquid for forming the antiglare layer 120. It is preferred that a photopolymerization initiator that is suitable for the material forming the binder matrix be used. Examples of the photopolymerization initiator include benzoin and alkyl ethers thereof such as benzoin methyl ether, benzoin ethyl ether, benzoin isopropyl ether, and benzyl methyl ketal. The amount of the photopolymerization initiator used is 0.5 to 20 parts by weight relative to the binder matrix forming material. The preferred amount is 1 part by weight to 5 parts by weight.

Examples of the particles 122 of the embodiment of the present invention include acrylic particles (refractive index 1.49), acryl styrene particles (refractive index 1.49-1.59), polystyrene particles (refractive index 1.59), polycarbonate particles (refractive index 1.58), melamine particles (refractive index 1.66), epoxy particles (refractive index 1.58), polyurethane particles (refractive index 1.55), nylon particles (refractive index 1.50), polyethylene particles (refractive index 1.50-1.56), polypropylene particles (refractive index 1.49), silicone particles (refractive index 1.43), polytetrafluoroethylene particles (refractive index 1.35), polyfluorovinylidene particles (refractive index 1.42), polyvinyl chloride particles (refractive index 1.54), polyvinylidene chloride particles (refractive index 1.62), and glass particles (refractive index 1.48), silica (refractive index 1.43). In the embodiment of the present invention, particles 122 of a plurality of kinds may be used as the particles 122.

If necessary, a solvent can be added to the coating liquid for forming the antiglare layer 120. By adding a solvent, it is possible to disperse uniformly the particles 122 in the material forming the binder matrix 121, or when the coating liquid for forming the antiglare layer 120 is coated on the first transparent substrate 110, the solution viscosity can be adjusted to an adequate range.

In the embodiment of the invention, triacetyl cellulose is used as the first transparent substrate 110, and the antiglare layer 120 is directly formed on the triacetyl cellulose film, without other functional layers being interposed therebetween. In a case where the antiglare layer 120 is directly provided, it is preferred that a mixed solvent of a solvent that dissolves the triacetyl cellulose film or causes swelling thereof and a solvent that neither dissolves the triacetyl cellulose film nor causes swelling thereof be used as the solvent for the coating liquid for forming the antiglare layer 120. By using the mixed solvent, it is possible to obtain the antiglare film 100 with sufficient adhesion at the interface of the triacetyl cellulose film (first transparent substrate 110) and antiglare layer 120.

At this time, examples of the solvent that dissolves the triacetyl cellulose film (first transparent substrate 110) or causes swelling thereof include ethers such as dibutylether, dimethoxymethane, dimethoxyethane, diethoxyethane, propylene oxide, dioxane, dioxolan, tiroxane, tetrahydrofuran, anisole, and penetol, some ketones such as acetone, methyl ethyl ketone, diethyl ketone, dipropyl ketone, diisobutyl ketone, cyclopentanone, cyclohexanone, methyl cyclohexanone, and ethyl cyclohexanone, esters such as ethyl formate, propyl formate, n-pentyl formate, methyl acetate, ethyl acetate, methyl propionate, ethyl propionate, n-pentyl acetate, and γ-butyrolactone, and cellosolves such as methyl cellosolve, cellosolve, butyl cellosolve, and cellosolve acetate. These solvents can be used individually or in combinations of two or more thereof.

Examples of the solvent that neither dissolves the triacetyl cellulose film nor causes swelling thereof include aromatic hydrocarbons such as toluene, xylene, cyclohexane, and cyclohexylbenzene, hydrocarbons such as n-hexane, and some ketones such as methyl isobutyl ketone and methyl butyl ketone. These solvents can be used individually or in combinations of two or more thereof.

In the antiglare layer 120 of the embodiment of the invention, an additive that is called a surface adjusting agent may be added to prevent the occurrence of coating defects such as repelling and unevenness in the antiglare layer 120 (coating film) that is formed by coating. Depending on the action thereof, the surface adjusting agent is also called a leveling agent, an antifoaming agent, an interface tension adjusting agent, and a surface tension adjusting agent, but all these agents act to decrease the surface tension of the coating film (antiglare layer 120) that is formed.

Examples of additives that are usually used as the surface adjusting agent include silicone additives, fluoroadditives, and acrylic additives. Examples of suitable silicone additives include derivatives having polydimethylsiloxane as the main chain in which a side chain of the polydimethylsiloxane is modified. For example, a polyether-modified dimethylsiloxane can be used as the silicone additive. Compounds having a perfluoroalkyl group are used as the fluoroadditives. Compounds having a main chain obtained by polymerization of acryl monomer, methacryl monomer, or styrene monomer can be used as the acrylic additives. The acrylic additives may have not only a structure obtained by polymerization of acryl monomer, methacryl monomer, or styrene monomer as the main chain but also a substituent such as an alkyl group, a polyether group, a polyester group, a hydroxyl group, or an epoxy group in side chains.

In addition to the above-described surface adjusting agent, other additives may be also added to the coating liquid for forming the antiglare layer 120 of the embodiment of the invention. However, it is preferred that these additives produce no adverse effect on the transparency and light diffusing ability of the antiglare layer 120 that is formed. Examples of functional additives include an antistat, an ultraviolet absorber, an infrared absorber, an antifouling agent, a water repellent, a refractive index adjusting agent, an adhesiveness improver, and a curing agent. As a result, functions other than the antiglare function, such as an antistatic function, an ultraviolet absorption function, an infrared absorption function, an antifouling function, and a water repellent function can be imparted to the antiglare layer formed.

The coating liquid for forming the antiglare layer 120 of the embodiment of the invention is coated on the first transparent substrate 110 to form a coating film. A coating method using a roll coater, a reverse roll coater, a gravure coater, a knife coater, a bar coater, or a die coater can be used as a method for coating the coating liquid for forming the antiglare layer 120 on the first transparent substrate 110. Among these coaters, a die coater suitable for high-speed coating in a roll-to-roll system is preferably used. The concentration of solids in the coating liquid differs depending on the coating method. The adequate concentration of solids is about 30-70 wt. %.

Figure 2:
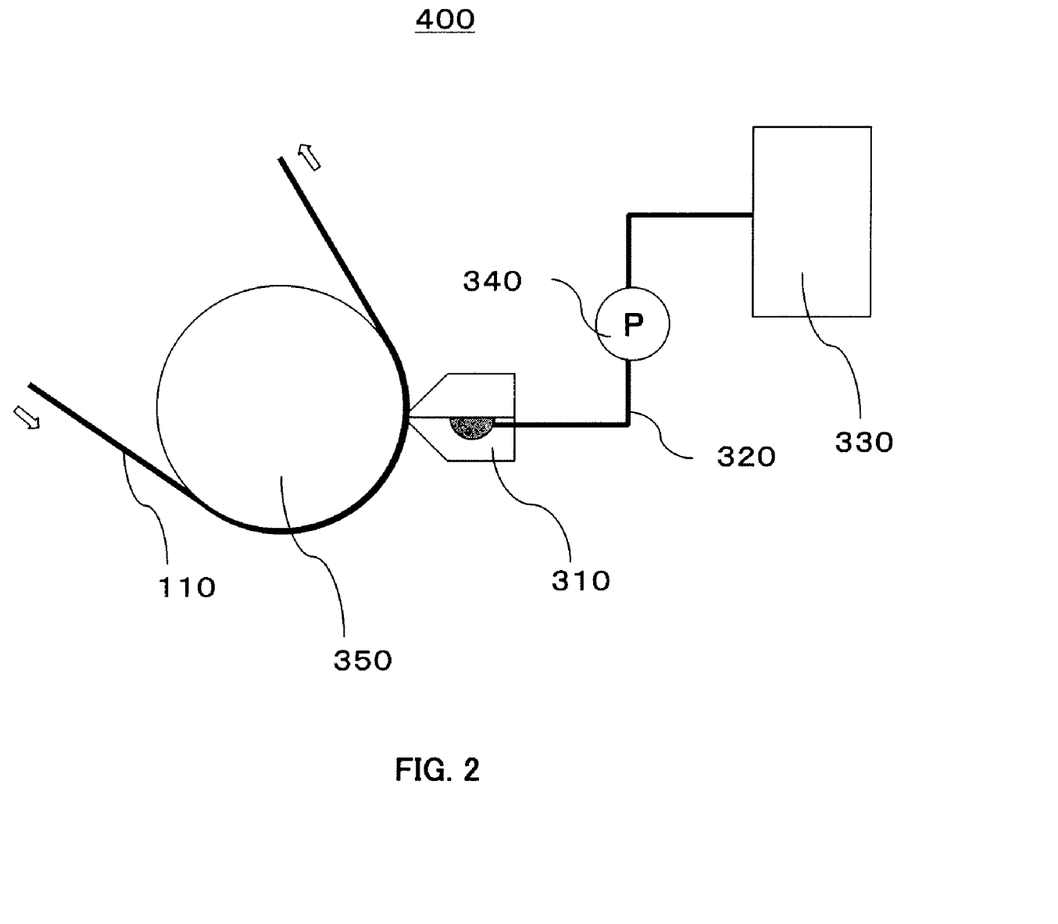
FIG. 2 is a schematic cross-sectional view illustrating a transmission type liquid crystal display using the antiglare film of the embodiment of the present invention.

Next, a coating apparatus 400 using a die coater of the embodiment of the invention is described below. FIG. 2 is a schematic cross-sectional view of the die coater coating apparatus 400 of the embodiment of the invention. The die coater coating apparatus 400 of the embodiment of the invention has a structure in which a die head 310 and a coating liquid tank 330 are connected together with a pipework 320, and the coating liquid for forming the antiglare layer 120 that is located in the coating liquid tank 330 is pumped by a transfer pump 340 into the die head 310. The coating liquid for forming the antiglare layer 120 that has been pumped into the die head 310 is ejected from a slit gap, and a coating film is formed on the first transparent substrate 110. By using the wound first transparent substrate 110 and a rotary roll 350, it is possible to form a coating film continuously on the first transparent substrate 110 by a roll-to-roll system.

The antiglare layer 120 is formed by irradiating the coating film obtained by coating the coating liquid on the first transparent substrate 110 with ionizing radiation. Ultraviolet radiation or electron beam can be used as the ionizing radiation. In the case of ultraviolet curing, a light source such as a high-pressure mercury lamp, a low-pressure mercury lamp, an ultrahigh-pressure mercury lamp, a metal halide lamp, a carbon arc, or a xenon arc can be used. Further, in the case of electron beam curing, an electron beam emitted from various electron beam accelerators such as a Cockroft-Walton accelerator, a Van de Graaff accelerator, a resonance transformer-type accelerator, an insulating core transformer-type accelerator, a linear accelerator, a dynamitron accelerator, or a high-frequency accelerator can be used. The electron beam preferably has energy of 50-1000 keV. An electron beam having energy of 100-300 keV is more preferred.

Before and/or after a process of forming the antiglare layer 120 by curing, a drying process may be implemented. Further, curing and drying may be performed simultaneously. In particular, in a case where the coating liquid includes a material of the binder matrix 121, the particles and the solvent, a drying process has to be implemented before irradiation with ionizing radiation in order to remove the solvent contained in the formed coating film. Examples of suitable drying means are heating, air blowing, and hot air blowing etc.

The antiglare film 100 produced by using the above-described method is of a type with a low content of particles that makes it possible to increase contrast and can demonstrate appropriate antiglare property, small white blurring, and a low level of glittering.

An image display device using the antiglare film of the embodiment of the invention will be described below. A transmission type liquid crystal display is explained below, but the antiglare film 100 of the embodiment of the invention can be provided not only on the transmission type liquid crystal display, but also on the surface of windows and on the surface of displays such as a CRT display, an electroluminescence display (ELD), a plasma display (PDP), a surface emission display (SED), and a field emission display (FED).

Figure 3A:
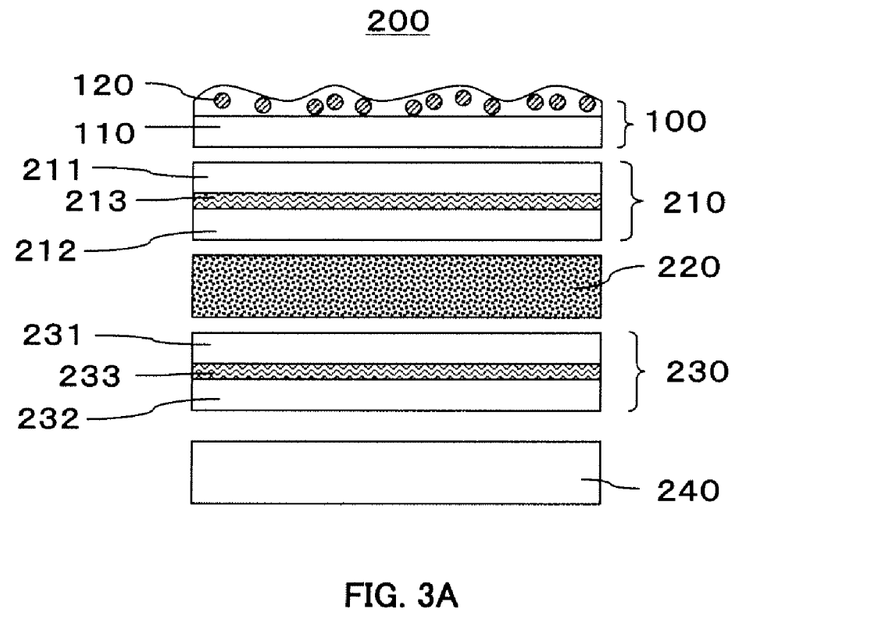
FIG. 3 is a schematic cross-sectional view illustrating a die coater coating device of the embodiment of the present invention.
Figure 3B:
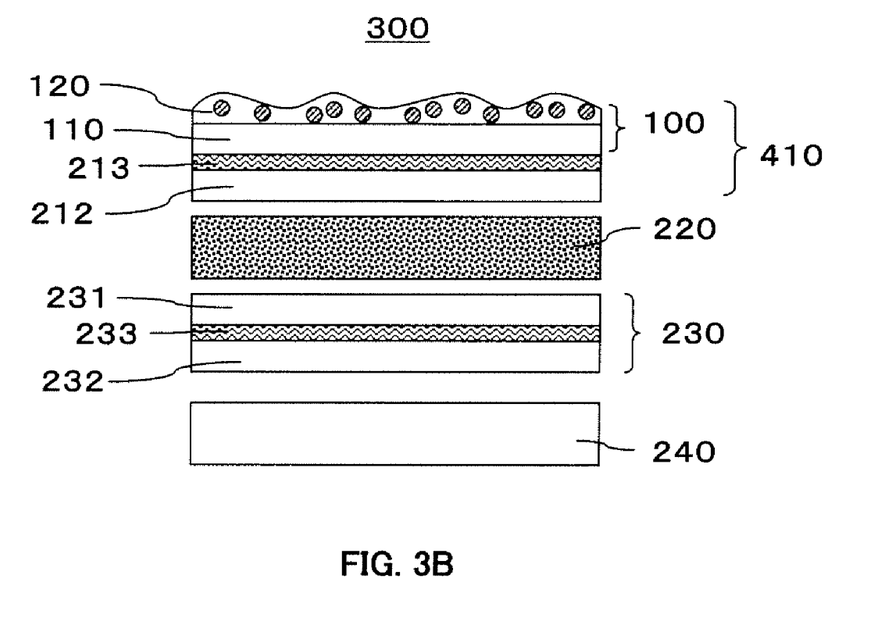

FIGS. 3A and 3B show transmission type liquid crystal displays 200 using the antiglare film 100 of the embodiment of the invention. As shown in FIG. 3A, the transmission-type liquid crystal display 200 of the embodiment of the invention is provided with the antiglare film 100, a polarizing plate 210, a liquid crystal cell 220, a polarizing plate 230, and a backlight unit 240. In this configuration, the side of the antiglare film 100 is the observation side, that is, the display surface.

The backlight unit 240 includes a light source and a light diffusion plate (none is shown in the figure). The liquid crystal cell 220 has a structure in which an electrode is provided on one transparent substrate, an electrode and a color filter are provided on the other transparent substrate, and a liquid crystal is sealed between the two electrodes (this structure is not shown in the figure). The first and second polarizing plates 210 and 230, which are provided so as to sandwich the liquid crystal cell 220, have a structure in which first and second polarizing layers 213 and 233 are sandwiched between the second to fifth substrates 211, 212, 231, and 232. A transmission type liquid crystal display 200 is thus obtained in which the first transparent substrate 110 of the antiglare film 100 and the second transparent substrate 211 of the first polarizing plate 210 are provided separately from each other.

As shown in FIG. 3B, a transmission type liquid crystal display 300 of the embodiment of the invention has a structure in which a third polarizing plate 410 has a first polarizing layer 213 provided on the surface of the first transparent substrate 110 of the antiglare film 100 that is on the side opposite to the antiglare layer 120, and the first transparent substrate 110 serves as the transparent substrate of both the antiglare film 100 and the third polarizing plate 410.

Further, as shown in FIG. 3B, a transmission type liquid crystal display 400 of the embodiment of the invention is provided with a first polarizing layer 213 on the surface of the first transparent substrate 110 located on the opposite side from the surface where the first antiglare layer 120 is located. In this case, for example, a stretched film of polyvinyl alcohol (PVA) having iodine added thereto can be used as the first polarizing layer 213. The first polarizing layer 213 in this case is sandwiched by the first transparent substrate 110 and third transparent substrate 212.

The transmission type liquid crystal displays 200 and 300 of the embodiment of the invention may include other functional elements. Examples of other functional elements include a diffusion film, a prism sheet, a luminance-increasing film for effectively using the light emitted from the backlight, and also a phase difference film for compensating the phase difference of the liquid crystal cell or polarizing plate, but the transmission type liquid crystal displays 200 and 300 of the embodiment of the invention are not limited to these elements.

The transmission type liquid crystal displays 200 and 300 using the antiglare film 100 of the embodiment of the present invention are of a type with a low content of particles that makes it possible to increase contrast and can demonstrates appropriate antiglare property, small white blurring, and a low level of glittering. In other words, the transmission type liquid crystal displays 200 and 300 that excel in visibility can be obtained.

EXAMPLES

The present embodiment will be explained below in greater detail using examples and comparative examples thereof.

As shown in FIG. 1, a triacetyl cellulose film (TD-80U, manufactured by Fuji Photo Film Co., Ltd.) was used as the first transparent substrate 110. The coating liquid for forming the antiglare layer 120 was composed of the binder matrix 121 shown in Table 1, the particles 122 of the coating liquid 1 shown in Table 2, and a solvent. The coating liquid for the antiglare layer 120 was coated on the triacetyl cellulose film by using the die coater coating device 400 and a coating film was obtained. The obtained coating film was dried and the solvent contained in the coating film was removed. The coating film was then cured by ultraviolet irradiation at 400 mJ/cm$^2$ with a high-pressure mercury lamp under an atmosphere with an oxygen concentration of equal to or less than 0.03%, and the antiglare film 100 was produced in which the antiglare layer 120 was provided on the first transparent substrate 110. The average film thickness H of the obtained antiglare layer 120 was 5.6 μm.

TABLE 1

| Type of coating liquid material | Material name | Parts by weight |
| --- | --- | --- |
| Resin curable by ionizing radiation | Pentaerythritol triacrylate (manufactured by Kyoeisha Chemical Co., Ltd.) | 94.5 |
| Polymerization initiator | Irgacure 184 (manufactured by Ciba Japan K.K.) | 5.0 |
| Leveling agent | Fluorine-containing additive Megafac F470 (manufactured by DIC Corporation) | 0.5 |

The average film thickness of the antiglare layer 120 in this case was measured with a scanning electron microscope. The average particle diameter R, 25% diameter ($R_{25}$), and 75% diameter ($R_{75}$) of the particles 122 were measured with a particle size distribution measurement device of a light scattering type (SALD-7000, manufactured by Shimadzu Corporation). The refractive index of the particles 122 and refractive index of the binder matrix 121 were also found. The refractive index $n_A$ of the particles 122 was measured by the Becke line detection method (liquid immersion method). The refractive index $n_M$ of the binder matrix was measured by the Becke line detection method (liquid immersion method) by using a coating liquid composed of a solvent and the material for forming the binder matrix 121 without the particles 122, coating, drying, and curing with ultraviolet radiation.

In Examples 2 to 12 and Comparative Examples 1 to 8, the refractive index $n_A$ of the particles 122, average diameter R, 25% diameter ($R_{25}$), and 75% diameter ($R_{75}$) of the particles 122, average film thickness H of the antiglare layer 120, and content of particles 122 were varied as shown in Table 2 and antiglare films 100 of Examples 2 to 12 and Comparative Examples 1 to 8 were produced. In Examples 2 to 12 and Comparative Examples 1 to 8, the antiglare films 100 were produced by using acrylic material, photopolymerization initiators, and surface adjusting agents for the materials for forming the binder matrix 121 and also using the same solvent as in Example 1. Further, in Examples 2 to 12 and Comparative Examples 1 to 8, the antiglare films 100 were produced under the same drying conditions and ultraviolet irradiation conditions as in Example 1, except that the coating amount was varied to change the average film thickness of the antiglare layer 120, by using the die coater coating device 400 identical to that used in Example 1.

Table 2 shows the refractive index $n_A$ of the particles 122, average particle diameter R, 25% diameter ($R_{25}$), and 75% diameter ($R_{75}$) of the particles 122, average film thickness H of the antiglare layer 120, and content of particles 122 in the antiglare films 100 of Examples 1 to 12 and Comparative Examples 1 to 8.

TABLE 2

| Examples, Comparative Examples | | Particles | | | | | Average film thickness of antiglare layer (H) |
|---|---|---|---|---|---|---|---|
| | Type | Refractive index (nA) | Average particle diameter (R) | 25% Diameter ($R_{25}$) | 25% Diameter ($R_{75}$) | Parts by weight | |
| Example 1 | PMMA | 1.495 | 5.0 | 4.1 | 5.6 | 4.0 | 5.6 |
| Example 2 | PMMA—styrene | 1.515 | 5.0 | 3.7 | 6.4 | 4.0 | 5.7 |
| Comparative Example 1 | PMMA—styrene | 1.520 | 5.0 | 3.9 | 6.0 | 4.0 | 5.7 |
| Example 3 | PMMA | 1.495 | 4.5 | 3.3 | 5.8 | 4.0 | 6.4 |
| Example 4 | PMMA—styrene | 1.490 | 5.0 | 4.4 | 5.6 | 2.0 | 6.2 |
| Comparative Example 2 | PMMA—styrene | 1.490 | 4.5 | 3.0 | 5.7 | 3.0 | 5.5 |
| Comparative Example 3 | PMMA—styrene | 1.505 | 5.0 | 4.9 | 5.6 | 2.0 | 5.9 |
| Example 5 | PMMA—styrene | 1.545 | 4.5 | 3.3 | 5.0 | 2.0 | 4.7 |
| Example 6 | PMMA | 1.495 | 4.5 | 3.3 | 5.8 | 4.0 | 4.7 |
| Comparative Example 4 | PMMA—styrene | 1.545 | 4.0 | 3.5 | 4.2 | 2.0 | 4.6 |
| Comparative Example 5 | PMMA—styrene | 1.545 | 5.0 | 3.7 | 6.8 | 2.0 | 4.9 |
| Example 7 | PMMA—styrene | 1.505 | 5.0 | 3.7 | 6.2 | 4.5 | 8.5 |
| Example 8 | PMMA—styrene | 1.505 | 5.0 | 3.7 | 6.2 | 4.5 | 4.4 |
| Comparative Example 6 | PMMA—styrene | 1.505 | 5.0 | 3.7 | 6.2 | 4.5 | 9.6 |
| Comparative Example 7 | PMMA—styrene | 1.505 | 5.0 | 3.7 | 6.2 | 4.5 | 4.0 |
| Example 9 | PMMA | 1.495 | 4.0 | 3.0 | 4.9 | 2.0 | 3.5 |
| Example 10 | PMMA | 1.495 | 8.0 | 6.7 | 9.5 | 4.0 | 10.4 |
| Example 11 | PMMA | 1.495 | 4.5 | 3.8 | 5.4 | 0.5 | 3.8 |
| Example 12 | PMMA | 1.495 | 4.5 | 3.3 | 5.8 | 5.0 | 4.2 |
| Comparative Example 8 | PMMA | 1.495 | 4.5 | 3.3 | 5.8 | 0.4 | 4.5 |

The evaluation of antiglare ability, white blurring, and glittering was conducted by the following methods with respect to the antiglare films 100 of Examples 1 to 12 and Comparative Examples 1 to 8.

Antiglare Ability

The antiglare films 100 obtained in Examples 1 to 12 and Comparative Examples 1 to 8 were pasted onto a black plastic plate with an adhesive, the fluorescent lamp light was caused to reflect therefrom, and the clearness of the image was visually evaluated. As a result of visual evaluation, it was represented by a "double circle" symbol (◯◯), where the image of the fluorescent lamp light was not felt completely, it was represented by a "circle" symbol (◯), where the image of the fluorescent lamp light was not felt, and it was represented by a "cross" symbol (x), where the image of the fluorescent lamp light was clearly found and felt.

(White Blurring)

The antiglare films 100 obtained in Examples 1 to 12 and Comparative Examples 1 to 8 were pasted onto a black plastic plate with an adhesive, the fluorescent lamp light was caused to reflect therefrom, and the degree of light diffusion at the antiglare films 100 was visually evaluated. In a case where the diffusion of light was extremely small and whiteness was practically not felt at the antiglare films, the evaluation result was represented by a "double circle" symbol (◯◯), where the diffusion of light was small and whiteness was not felt, the evaluation result was represented by a "circle" symbol (◯), and when the whiteness was felt at an unacceptable level, the evaluation result was represented by a "cross" symbol (x).

(Glittering)

A black matrix (BM) glass substrate having an 80 ppi to 200 ppi pattern was disposed on a light table having a fluorescent lamp incorporated therein, a glass substrate having the antiglare film 100 pasted thereto was disposed on the black matrix glass substrate, and flare of the antiglare film 100 was visually evaluated from above. In this case, the largest from among the BM resolutions for which glittering was not significant was considered as a corresponding resolution, and the evaluation result was (◯) when the corresponding resolution was equal to or higher than 120 ppi and (x) when the corresponding resolution was less than 120 ppi.

Table 3 shows the evaluation results on "Antiglare Ability", "White Blurring", and "Glittering" of the antiglare films 100 obtained in Examples 1 to 12 and Comparative Examples 1 to 8. The refractive index difference $|n_A-n_M|$ between a refractive index $n_A$ of the particles 122 and a refractive index $n_M$ of the binder matrix 121, $R_{25}/R$, which is a value obtained by dividing a 25% diameter ($R_{25}$) of the particles 122 by an average particle diameter R, $R_{75}/R$, which is a value obtained by dividing a 75% diameter ($R_{75}$) of the particles 122 by an average particle diameter R, $R_{75}/H$, which is a value obtained by dividing the 75% diameter ($R_{75}$) of the particles 122 by an average film thickness H of the antiglare layer 120, and the average film thickness H of the antiglare layer 120 and the content of the particles 122, are also shown in the table.

TABLE 3

| Examples, Comparative Examples | | $\|n_A-n_M\|$ | $R_{25}/R$ | $R_{75}/R$ | $R_{75}/H$ | H | Content of particles | Antiglare ability | White blurring | Glittering |
|---|---|---|---|---|---|---|---|---|---|---|
| Example | 1 | 0.030 | 0.82 | 1.12 | 1.00 | 5.6 | 4.0 | ⊚ | ⊚ | ○ |
| Example | 2 | 0.010 | 0.74 | 1.28 | 1.12 | 5.7 | 4.0 | ○ | ○ | ○ |
| Comparative Example | 1 | 0.005 | 0.78 | 1.20 | 1.05 | 5.7 | 4.0 | X | ⊚ | X |
| Example | 3 | 0.030 | 0.73 | 1.29 | 0.91 | 6.4 | 4.0 | ○ | ○ | ○ |
| Example | 4 | 0.035 | 0.89 | 1.12 | 0.90 | 6.2 | 2.0 | ○ | ○ | ○ |
| Comparative Example | 2 | 0.035 | 0.67 | 1.27 | 1.04 | 5.5 | 3.0 | X | ○ | X |
| Comparative Example | 3 | 0.020 | 0.98 | 1.12 | 0.95 | 5.9 | 2.0 | ○ | X | ○ |
| Example | 5 | 0.020 | 0.74 | 1.11 | 1.06 | 4.7 | 2.0 | ○ | ○ | ○ |
| Example | 6 | 0.030 | 0.73 | 1.29 | 1.23 | 4.7 | 4.0 | ⊚ | ○ | ○ |
| Comparative Example | 4 | 0.020 | 0.88 | 1.05 | 0.91 | 4.6 | 2.0 | X | ⊚ | ○ |
| Comparative Example | 5 | 0.020 | 0.74 | 1.36 | 1.39 | 4.9 | 2.0 | ⊚ | X | X |
| Example | 7 | 0.020 | 0.74 | 1.24 | 0.73 | 8.5 | 4.5 | ○ | ⊚ | ○ |
| Example | 8 | 0.020 | 0.74 | 1.24 | 1.41 | 4.4 | 4.5 | ○ | ○ | ○ |
| Comparative Example | 6 | 0.020 | 0.74 | 1.24 | 0.65 | 9.6 | 4.5 | X | ⊚ | ○ |
| Comparative Example | 7 | 0.020 | 0.74 | 1.24 | 1.55 | 4.0 | 4.5 | ⊚ | X | X |
| Example | 9 | 0.030 | 0.75 | 1.22 | 1.39 | 3.5 | 2.0 | ○ | ○ | ○ |
| Example | 10 | 0.030 | 0.84 | 1.19 | 0.92 | 10.4 | 4.0 | ○ | ○ | ○ |
| Example | 11 | 0.030 | 0.84 | 1.19 | 1.41 | 3.8 | 0.5 | ○ | ○ | ○ |
| Example | 12 | 0.030 | 0.73 | 1.29 | 1.38 | 4.2 | 5.0 | ○ | ○ | ○ |
| Comparative Example | 8 | 0.030 | 0.73 | 1.29 | 1.29 | 4.5 | 0.4 | X | ⊚ | ○ |

The antiglare films 100 of Examples 1 to 12 and Comparative Examples 1 to 8 were pasted by using a pressure-sensitive adhesive onto a liquid crystal monitor (FTD-W2023ADSR, manufactured by BUFFALO INC.) and brightness during white display (white brightness) and brightness during black display (black brightness) of the liquid crystal monitor were checked. All the antiglare films 100 were confirmed to have good contrast.

Comparison of the antiglare films 100 obtained in Examples 1 to 12 and the antiglare films 100 obtained in Comparative Examples 1 to 8 demonstrates that the antiglare films 100 obtained in Examples 1 to 12 are the antiglare films 100 having appropriate antiglare ability, low white blurring, and small glittering.

What is claimed is:

1. An antiglare film comprising:
a transparent substrate; and
an antiglare layer that is formed on the transparent substrate, has a concave-convex structure on the surface on the opposite side from the transparent substrate, and includes a binder matrix and particles, wherein
a content ratio of the particles in the binder matrix is within a range of equal to or greater than 0.5 wt. % and equal to or lower than 5 wt. %,
a refractive index difference $|n_A - n_M|$ between a refractive index $n_A$ of the particles and a refractive index $n_M$ of the binder matrix is equal to or greater than 0.010,
$R_{25}/R$, which is a value obtained by dividing a 25% diameter ($R_{25}$) of the particles by an average particle diameter R, is equal to or greater than 0.7 and equal to or less than 0.9,
$R_{75}/R$, which is a value obtained by dividing a 75% diameter ($R_{75}$) of the particles by an average particle diameter R, is equal to or greater than 1.10 and equal to or less than 1.30,
$R_{75}/H$, which is a value obtained by dividing the 75% diameter ($R_{75}$) of the particles by an average film thickness H of the antiglare layer, is equal to or greater than 0.70 and equal to or less than 1.50, and
the average film thickness of the antiglare layer is within a range of equal to or greater than 3.0 μm and equal to or less than 12.0 μm.

2. A method for manufacturing an antiglare film, the method comprising:
preparing a transparent substrate;
forming a coating film by coating on the transparent substrate a coating liquid for forming an antiglare layer including a material for forming a binder matrix curable by ionizing radiation and particles; and
curing the binder matrix with ionizing radiation, wherein
a content ratio of the particles in the binder matrix is within a range of equal to or greater than 0.5 wt. % and equal to or lower than 5 wt. %,
a refractive index difference $|n_A - n_M|$ between a refractive index $n_A$ of the particles and a refractive index $n_M$ of the binder matrix is equal to or greater than 0.010,
$R_{25}/R$, which is a value obtained by dividing a 25% diameter ($R_{25}$) of the particles by an average particle diameter R, is equal to or greater than 0.7 and equal to or less than 0.9,
$R_{75}/R$, which is a value obtained by dividing a 75% diameter ($R_{75}$) of the particles by an average particle diameter R, is equal to or greater than 1.10 and equal to or less than 1.30, and
$R_{75}/H$, which is a value obtained by dividing the 75% diameter ($R_{75}$) of the particles by an average film thickness H of the antiglare layer, is equal to or greater than 0.70 and equal to or less than 1.50, and the average film thickness of the antiglare layer is within a range of equal to or greater than 3.0 µm and equal to or less than 12.0 µm.

3. The method according to claim 2, wherein
the antiglare layer is formed by using a die coater method.

4. A transmission type liquid crystal display formed by using the antiglare film according to claim 1, wherein
the antiglare film, a polarizing plate, a liquid crystal cell, a polarizing plate, and a backlight unit are provided in the order of description from the observer side, and the antiglare layer of the antiglare film is on the surface facing the observer.

5. A polarizing plate comprising:
the antiglare film according to claim 1; and
a polarizing layer formed on a surface of the transparent substrate of the antiglare film that is opposite a formation surface of the antiglare layer.

6. A transmission type liquid crystal display formed by using the polarizing plate according to claim 5, wherein
the polarizing plate, a liquid crystal cell, a polarizing plate, and a backlight unit are provided in the order of description from the observer side, and the antiglare layer of the antiglare film is on the surface facing the observer.

* * * * *